United States Patent
Knuckey et al.

(10) Patent No.: US 8,647,781 B2
(45) Date of Patent: Feb. 11, 2014

(54) REDOX FUEL CELLS

(75) Inventors: Kathryn Knuckey, Ormskirk (GB); David Rochester, Hetton-le-Hole (GB); Andrew Martin Creeth, Chester (GB)

(73) Assignee: Acal Energy Limited, Cheshire (GB)

( * ) Notice: Subject to any disclaimer, the term of this patent is extended or adjusted under 35 U.S.C. 154(b) by 631 days.

(21) Appl. No.: 12/864,496

(22) PCT Filed: Jan. 23, 2009

(86) PCT No.: PCT/GB2009/050067
§ 371 (c)(1),
(2), (4) Date: Sep. 23, 2010

(87) PCT Pub. No.: WO2009/093082
PCT Pub. Date: Jul. 30, 2009

(65) Prior Publication Data
US 2011/0014532 A1    Jan. 20, 2011

(30) Foreign Application Priority Data
Jan. 23, 2008   (GB) .................................. 0801199.1

(51) Int. Cl.
*H01M 8/10* (2006.01)

(52) U.S. Cl.
USPC .......................................... 429/416; 429/492

(58) Field of Classification Search
USPC ................................................ 429/416, 492
See application file for complete search history.

(56) References Cited

U.S. PATENT DOCUMENTS

| | | |
|---|---|---|
| 3,152,013 A | 10/1964 | Juda |
| 3,279,949 A | 10/1966 | Schaefer et al. |
| 3,294,588 A | 12/1966 | Beltzer et al. |
| 3,360,401 A | 12/1967 | Grasselli et al. |
| 3,540,933 A | 11/1970 | Boeke |

(Continued)

FOREIGN PATENT DOCUMENTS

| EP | 0 043 647 | 1/1982 |
|---|---|---|
| EP | 0 228 168 | 11/1986 |

(Continued)

OTHER PUBLICATIONS

S.R. Alley and W. Henderson, "Synthesis and characterization of ferrocenyl-phosphonic and -arsonic acids." J. Organomet. Chem., 637-639, 2001, 216-229.

(Continued)

*Primary Examiner* — Mark F Huff
*Assistant Examiner* — Monique Wills
(74) *Attorney, Agent, or Firm* — Knobbe Martens Olson & Bear LLP (57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, and a transition metal complex of a multidentate macrocyclic N-donor ligand as a redox catalyst catalysing the regeneration of the mediator.

45 Claims, 2 Drawing Sheets

(56) References Cited

U.S. PATENT DOCUMENTS

| | | |
|---|---|---|
| 3,607,420 A | 9/1971 | Cutler |
| 4,048,383 A | 9/1977 | Clifford |
| 4,396,687 A | 8/1983 | Kummer et al. |
| 5,250,158 A | 10/1993 | Kaneko et al. |
| 5,298,343 A | 3/1994 | Savadogo et al. |
| 5,660,940 A | 8/1997 | Larsson et al. |
| 5,683,829 A | 11/1997 | Sarangapani |
| 5,958,616 A | 9/1999 | Salinas et al. |
| 6,054,580 A | 4/2000 | Collins et al. |
| 2001/0028977 A1 | 10/2001 | Kazacos et al. |
| 2003/0152823 A1 | 8/2003 | Heller |
| 2004/0028203 A1 | 2/2004 | Wurster et al. |
| 2004/0028992 A1 | 2/2004 | Jaouen |
| 2004/0137297 A1 | 7/2004 | Matsuoka et al. |
| 2005/0074653 A1 | 4/2005 | Broman |
| 2005/0112055 A1 | 5/2005 | Shannon et al. |
| 2005/0158618 A1 | 7/2005 | Liberatore et al. |
| 2005/0244707 A1 | 11/2005 | Skyllas-Kazacos et al. |
| 2006/0012637 A1 | 1/2006 | Furukawa et al. |
| 2006/0024539 A1 | 2/2006 | Dumesic |
| 2006/0088750 A1 | 4/2006 | Nobuta |
| 2006/0134493 A1 | 6/2006 | Yoshida et al. |
| 2006/0216565 A1 | 9/2006 | Cooray et al. |
| 2007/0078052 A1 | 4/2007 | Grinberg et al. |
| 2007/0122689 A1 | 5/2007 | Kubo et al. |
| 2007/0131546 A1 | 6/2007 | Nomoto et al. |
| 2008/0274385 A1 | 11/2008 | Creeth |
| 2009/0308752 A1 | 12/2009 | Evans et al. |
| 2009/0317668 A1 | 12/2009 | Creeth et al. |
| 2009/0325002 A1 | 12/2009 | Creeth et al. |
| 2010/0112388 A1 | 5/2010 | Knuckey et al. |
| 2010/0112393 A1 | 5/2010 | Knuckey et al. |
| 2010/0297522 A1 | 11/2010 | Creeth et al. |
| 2011/0027671 A1 | 2/2011 | Knuckey et al. |
| 2011/0039170 A1 | 2/2011 | Creeth et al. |
| 2011/0091746 A1 | 4/2011 | Knuckey et al. |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 91/13681 | 9/1991 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 01/73881 | 10/2001 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO2007/101284 | * 9/2007 ............ H01M 8/18 |
| WO | WO 2007/110663 | 10/2007 |
| WO | WO 2007/122431 | 11/2007 |
| WO | WO 2008/009992 | 1/2008 |
| WO | WO 2008/009993 | 1/2008 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |

OTHER PUBLICATIONS

I. Bernal et al., "Iron(II) Complexes of Polydentate Aminopyridyl Ligands and an Exchangeable Sixth Ligand: Reactions with peroxides . . . " J. Chem. Soc., Dalton. Trans., 1995, 3667-3675.

J. Chang, et al., "Synthesis and Characterization of Bis(d-2-pyridylmethanamine)ruthenium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127, 2004, 112-126.

W. R. Harris et al., "Chelating Tendencies of Pyridyl-Containing Polyamines and Oxygenation of the Cobaltous Complexes." Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

M. Klopstra, R. Hage, R.M. Kellogg and B.L. Feringa, "Non-heme iron catalysts for the benzylic oxidation: a parallel ligand screening approach," Tet. Lett. 44, 2003, 4581-4584.

G.R. Knox and P.L. Pauson, "Ferrocene Derivatives, Part VII. Some Sulphur derivatives," J. Chem. Soc., 1958, 682.

Limoges, B.R. et al. "Electrocatalyst materials for fuel cells based on the polyoxometalates [PMo(12-n) Vn040]<(3+n)->(n=0-3)", Electrochimica Acta, Elsevier Scient Publishers, Barking, GB, vol. 50, No. 5, Jan. 15, 2005pp. 1169, 1170, 1176-1179.

M. Lubben et al., "Nonheme Iron Centers in Oxygen Activation: Characterization of an Iron(III) Hydroperoxide Intermediate," Angew. Chem. Int. Ed. Engl., 34, 1995, 1512-1514.

D. L. Reger et al., "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-225.

H. Sato et al., "Convenient Synthesis of N,N,N',N'⁻ Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and its Derivatives," Chem. Pharm. Bull., 48, 2000, 1514-1518.

M. Van den Heuval et al., "Synthesis of a Non-Heme Template for Attaching Four Peptides: An Approach to Artifical Iron(II)—Containing Peroxidases," J. Organ. Chem., 69, 2004, 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

U.S. Appl. No. 11/911,945, filed Oct. 18, 2007, Fuel Cells.
U.S. Appl. No. 12/294,320, filed May 13, 2009, Fuel Cells.
U.S. Appl. No. 12/298,355, filed Jun. 26, 2009, Fuel Cells.
U.S. Appl. No. 12/374,352, filed Dec. 30, 2009, Fuel Cells.

(56) References Cited

OTHER PUBLICATIONS

U.S. Appl. No. 12/374,371, filed Jan. 11, 2010, Fuel Cells.
U.S. Appl. No. 12/678,687, filed Jul. 19, 2010, Redox Fuel Cell.
U.S. Appl. No. 12/679,478, filed Nov. 4, 2010, Fuel Cells.
U.S. Appl. No. 12/864,359, filed Dec. 8, 2010, Fuel Cells.
U.S. Appl. No. 12/864,498, filed Sep. 23, 2010, Fuel Cells.
U.S. Appl. No. 13/319,073, filed Nov. 4, 2011, Fuel Cells.

* cited by examiner

REDOX FUEL CELLS

CROSS-REFERENCE TO RELATED APPLICATIONS

This Application is the US National Phase under 35 U.S.C. §371 of International Application No. PCT/GB2009/050067, filed Jan. 23, 2009, which was published in English as International Publication No. WO 2009/093082 on Jul. 30, 2009, and claims the benefit of GB 0801199.1, filed Jan. 23, 2008.

BACKGROUND

1. Field

The present invention relates to fuel cells, in particular to indirect or redox fuel cells which have applications as power sources for: portable products such as portable electronics products; for transport vehicles such as automobiles, both main and auxiliary; auxiliary power for caravans and other recreational vehicles, boats etc; stationary uses such as uninterruptible power for hospitals computers etc and combined heat and power for homes and businesses. The invention also relates to the use of certain catalysts for use in such fuel cells.

2. Description of the Related Art

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode (anode for fuel). There are several types of fuel cell characterised by their different electrolytes. The liquid electrolyte alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysis of the oxygen reduction reaction. In addition expensive noble metal electrocatalysts are often used.

Many current fuel cell technologies employ cathodes where oxygen gas is flowed directly to the electrode where it then reacts with a catalyst to produce water. In many cases the catalyst employed is platinum, a precious metal. Not only does this increase the costs of the overall fuel cell, but the inefficiency of the reaction leads to a loss in available power.

U.S. Pat. No. 3,152,013 discloses a gaseous fuel cell comprising a cation-selective permeable membrane, a gas permeable catalytic electrode and a second electrode, with the membrane being positioned between the electrodes and in electrical contact only with the gas permeable electrode. An aqueous catholyte is provided in contact with the second electrode and the membrane, the catholyte selected from for example an oxidant couple therein. Means are provided for supplying a fuel gas to the permeable electrode, and for supplying a gaseous oxidant to the catholyte for oxidising reduced oxidant oxide is disclosed as a preferred catalyst for oxygen reduction, but with the consequence that pure oxygen was required as oxidant, the use of air as oxidant requiring the venting of noxious nitrogen oxide species.

An acknowledged problem concerning electrochemical fuel cells is that the theoretical potential of a given electrode reaction under defined conditions may be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

According to U.S. Pat. No. 3,540,933, certain advantages could be realised in electrochemical fuel cells by using the same electrolyte solution for both catholyte and anolyte. This document discloses the use of a liquid electrolyte containing more than two redox couples therein, with equilibrium potentials not more than 0.8 V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell. The use of platinum coated electrodes is also disclosed.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidised state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(v)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{10}V_2O_{40}$.

A significant amount of investigation into the interaction of certain N-donor complexes with oxidants such as hydrogen peroxide or peracids has been reported in the general literature and elsewhere.

WO-A-0012667 describes the use of N-donor complexes as transition metal bleach catalysts which can catalyse the oxidation of stains by air or dioxygen in aqueous solution.

WO0029537 describes the use of transition metal complexes containing cross-bridged macropolycyclic N-donor ligands as bleach catalysts which operate in detergent compositions which are substantially free of any organic or inorganic peroxygen compounds.

A thesis entitled 'Models for non-heme iron containing oxidation enzymes' by J. G. Roelfes (http://dissertations.ub-sug.nl/faculties/science/2000/j.g.roelfes/) mentions that Fe(N4Py) type complexes are capable of oxygen activation as demonstrated in DNA cleavage experiments.

M. Klopstra, R. Hage, R. M. Kellogg and B. L Fering a, *Tet. Lett.*, 2003, 44, 4581: discusses benzylic oxidation by catalysts such as Fe(N4Py) using $O_2$ as the oxidant. An autoxidation mechanism is proposed where Fe catalyst reacts with 1-phentlethylhydroperoxide.

U.S. Pat. No. 5,298,343 relates to polycomponent electrocatalysts suitable for use at the cathode of electrochemical and fuel cells.

US-A-2005/0112055 discloses a catalyst comprising a diruthenium-substituted polyoxometallate.

U.S. Pat. No. 6,054,580 discloses a large number of macrocyclic compounds, and methods for making them.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; they have not found practical, commercial utility in portable applications such as automotive and portable electronics.

SUMMARY

It is an object of the present invention to overcome or ameliorate one or more of the aforesaid disadvantages. It is a further object of the present invention to provide an improved catholyte solution for use in redox fuel cells.

A series of catalysts and/or mediators which are suitable for use in fuel cells and are based on transition metal complexes of N-donor ligands is described in PCT/GB2007/050421. It would however be desirable to provide N-donor ligand-based catalysts which are more robust at lower pH values to enable more acidic catholyte solutions to be used in a fuel cell containing a cation selective polymer electrolyte membrane. Additionally, it would be advantageous to provide N-donor ligand-based catalysts which are designed to minimise their interaction with the membrane.

The use of cyclic and/or pre-organised N-donor type ligands can provide access to transition metal N-donor catalysts with increased robustness at low pH values. The pre-arrangement of the ligand for transition metal binding increases the strength of metal binding over protonation under acidic conditions.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, the catholyte solution comprising a complexed multidentate macrocyclic N-donor ligand as said redox mediator and/or as a redox catalyst catalysing the regeneration of the said mediator.

By "macrocyclic" is preferably meant that the N-donor ligand is or comprises a molecular component containing a ring of seven or more atoms, and includes bicyclic (or polycyclic) rings in which seven or more atoms are present in the bicyclic (or polycyclic) ring structure, even though an or each individual ring of the bicycle (or polycycle) may comprise less than seven (most usually six) atoms.

In one embodiment, the N-donor ligand is preferably stable under acidic pH conditions, for example at pH<7, <5, <3 and/or <1.

The N-donor ligand must comprise at least one macrocycle, by which is meant either that the ligand as a whole has macrocyclic structure and/or that the ligand comprises a number of different parts, at least one of which has a macrocyclic structure. However, not all N-donor atoms need to be contained within the at least one macrocycle, although they may be. Further N-donor atoms may or may not be incorporated into substituent or pendent arms of the at least one macrocycle or of other parts of the N-donor ligand.

The number of N-donor atoms in the N-donor ligand is preferably from 1 to 8, more preferably from 3 to 6, and most preferably from 4 to 6.

N-donor atoms within the macrocycle may for example be contained within either an aliphatic environment, selected from for example secondary and/or tertiary amines and amides, and/or within an optionally substituted heterocycle, which can in turn be aromatic or non-aromatic and which may contain substituents at any site.

N-donor atoms within the macrocycle can carry substituents. Examples include H, alkyl, alkenyl, alkynyl, aryl, cycloalkyl, heterocyclic, heteroaryl, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

N-donor atoms within the macrocycle may be connected together by any suitable connecting group selected from, for example, $C_1$-$C_6$ aliphatic carbon chains, alkene, alkyne, aryl, alkylaryl, carbocyclic groups, heteroaryl groups, amide, ether, ester, ketone, carbonyl containing groups, and from alkyl, alkenyl, aryl, cycloalkyl, alkaryl, alkenaryl, aralkyl, aralkenyl groups substituted with one or more of the aforesaid functional groups.

The macrocycle can carry substituents at any suitable position on the ring.

The N-donor containing macrocycle may or may not be bridged/cross-linked to form a more rigid structure and/or a cage like system. This will result in the formation of a molecule which has >1 cycle, e.g. bicyclo-, tricyclo-systems. The bridging unit can link between carbon atoms and/or nitrogen atoms contained within the macrocycle. The bridging unit may link two or more of the macrocycle atoms. In order to create a cross-linked system, the bridging should not take place between adjacent atoms in the macrocycle. The bridging unit may or may not contain further N-donor atoms.

In cases where the bridging unit does not contain an N-donor, it may be a $C_1$-$C_4$ alkyl unit ($C_2$-$C_3$ preferred), and/or may contain alkyne, aryl, alkylaryl, carbonyl, carboxylate, ketone, ether and/or ester groups.

In cases where the bridging unit does contain further N-donors, there may be from one to three additional N-donor atoms in the bridging unit.

In cases where the bridging unit does contain one or more further N-donors, the N-donor/s may be contained within an optionally substituted aromatic or aliphatic environment. The length of the bridging unit is preferably from 3 to 11 atoms long. E.g. alkylheteroaryl, alkylamine.

The macrocycle may comprise the following general structure:

wherein R may be any substituent group selected from for example H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups;

R groups may be the same or different and may or may not contain further N-donor sites;

X is a non-N-containing linking group and may contain carbon, hydrogen, sulphur, oxygen, phosphorous and/or halides. E.g. C1-C6 alkyl carbon chains (of these C2-C5 is preferred, C2-C3 more preferred). When X=CR'$_2$, a=2, 3, 4 or 5, b=2, 3, 4 or 5. Atoms contained within the X linker group may be substituted with any substituent group;

a and b may be the same or different; and c may be 2-5.

Non-limiting examples of such a structure include:

wherein $R^1$-$R^4$ may be the same or different substituents;

$R^1$-$R^4$ may or may not contain further N-donor sites; and $R^1$-$R^4$ are independently selected from: H, alkyl, alkenyl, alkynyl, aryl, cycloalkyl, heterocyclic, heteroaryl, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

Preferred $R^1$-$R^4$ substituents include: H, alkyl, aryl, heteroaryl, heterocyclic, sulfonic acid, sulfonate, phosphonic acid, phosphonate and alkyl, alkenyl, aryl, cycloalkyl, alkaryl, alkenaryl, aralkyl, aralkenyl groups substituted with one or more of the aforesaid functional groups.

For example, methylpyridyl substituents as displayed are used in the following non-limiting examples:

-continued

-continued

The macrocycle may or may not also carry substituents at the carbon atom sites.

It is also possible to introduce cross-bridging units to increase rigidity or form a cage like structure. In this case, the macrocycle may comprise the following general structure:

wherein a, b, c and d may be 1-5, preferably 1-4, more preferably 1-2.

n may be 0-4, preferably 1-3.

The cross-bridging link may also contain a further N-donor site.

Any substituents may be carried at any suitable N or C site. Non-limiting examples include:

n may be 0-4. Prefer n to be 1-3.

Substituent examples ($R^2$ and, independently, $R^3$) include: H, alkyl, alkenyl, alkynyl, aryl, cycloalkyl, heterocyclic, heteroaryl, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

Preferred substituents include: H, alkyl, aryl, heteroaryl, heterocyclic, sulfonic acid, sulfonate, phosphonic acid, phosphonate and alkyl, alkenyl, aryl, cycloalkyl, alkaryl, alkenaryl, aralkyl, aralkenyl groups substituted with one or more of the aforesaid functional groups.

Alternatively, the macrocycle may comprise the following general structure:

wherein n may be 1-5, or more preferably 1-3, and most preferably 1-2.

R may be the same or different substituents on the N-donor atoms.

R may or may not contain further N-donor sites.

R examples include, independently: H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

Preferred R examples include: H, alkyl, aryl, heterocyclic, heteroaryl, sulfonic acid, sulfonate, phosphonic acid, phosphonate and alkyl, alkenyl, aryl, cycloalkyl, alkaryl, alkenaryl, aralkyl, aralkenyl groups substituted with one or more of the aforesaid functional groups.

R' may be the same or different substituent groups. There may be 1-3 R' groups per pyridyl ring, each of which may be the same or different.

R' examples: H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

The aliphatic N-donor atoms contained in the macrocycle may be bridged as described in the following figure:

R, R' and n have the same requirements as described for the non-bridged example given above. R" may be the same range of substituents as R.

m is an integer value from 1-5, more preferably 1-3 and most preferably 1-2.

X is a non N-containing bridging group, containing, for example, alkyl($C_2$-$C_4$), alkenyl, alkynyl, aryl, cycloalkyl, heteroaryl, heterocyclic, halogen, hydroxy, acyl, acyloxy, sulfate, sulfonyl, sulphinyl, carbonyl, carboxy, carboxylic acid, ester, ether, amido, sulfonate, sulfonic acid, phosphonate, phosphonyl, phosphonic acid, alkoxycarbonyl, thio, alkoxy, oxyester, aryloxy, to heterocycloalkyl and alkyl, alkenyl, aryl, cycloalkyl, alkaryl, alkenaryl, aralkyl, aralkenyl groups substituted with one or more of the aforesaid functional groups.

Non-Limiting Examples:

Alternatively, the macrocycle may comprise the following general structure:

X may or may not be a further coordinating atom. Examples of X include:

CR$_2$, O, C=O, NR, S.

R may be the same or different substituents on the N-donor atoms.

R may or may not contain further N-donor sites.

R examples: H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

R' may be the same or different substituents on the N-donor atoms.

R' may or may not contain further N-donor sites.

R' examples: H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

R" may be the same or different substituent groups. There may be 1-3 R" groups per pyridyl ring which may be the same or different.

R" examples: H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

Non-Limiting Examples:

Alternatively, the macrocycle may comprise the following general structure:

R, R' and R" may be the same or different substituent groups.

There may be 1-4 R' groups on the phenyl ring which may be the same or different groups.

R, R' and R" may be independently selected from H, alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

Non-Limiting Examples:

The catholyte may comprise the complexed multidentate N-donor ligand (the "ligand complex") as said redox mediator, and as said redox catalyst. Alternatively, the catholyte solution may comprise one or more alternative redox mediators, and the ligand complex as redox catalyst for the said mediator(s). Alternatively, the catholyte solution may comprise the ligand complex as redox mediator and one or more alternative redox catalysts for the ligand complex mediator. In other words the ligand complex can function alternatively as redox mediator an/or as redox catalyst in the catholyte solution, with or without one or more secondary redox mediator(s) and/or redox catalyst(s).

Thus, in a first system in accordance with the invention, the ligand complex functions as a redox catalyst (referred to below as "Cat") and is at least partially oxidised in the cathode region of the cell in operation thereof, and then reduced back to its original state at the electrode in regenerative redox cycle with the redox mediator (referred to below as "Med") in accordance with Scheme I:

Scheme I

In a second system in accordance with the invention, an alternative redox catalyst (referred to below as "Cat") is at least partially oxidised in the cathode region of the cell in operation thereof, and then reduced back to its original state at the electrode in regenerative redox cycle with the ligand complex redox mediator (referred to below as "Med") in accordance with Scheme II:

Scheme II

In a third system in accordance with the invention, the ligand complex functions as both redox catalyst (referred to below as "Cat") and as redox mediator (referred to below as "Med") in accordance with Scheme III:

Scheme III

Accordingly, in operation of the fuel cell of the invention the oxidant (i.e. oxygen or any other suitable oxidant) is reduced in the catholyte solution by the redox catalyst. Preferably, the resulting oxidised redox catalyst is effective at least partially to oxidise the mediator to regenerate the mediator after its reduction at the cathode.

Thus, one fuel cell in accordance with the invention is a PEM fuel cell that uses an aqueous cathode system with a catholyte consisting of two soluble active species, a mediator and a catalyst. Oxygen is reduced in solution by the catalyst, which in turn oxidises the mediator, which is then reduced back to its original state at the electrode. Completion of this cycle creates a regenerative redox cathode.

For fuel cell operation, oxygen reduction must be efficiently catalysed. Conventional technologies tend to employ heterogeneous catalysts for oxygen reduction, where a catalyst such as platinum is deposited at the electrode and termed an electrocatalyst. The present system instead (or as well) uses homogeneous catalysis, e.g. a water-soluble catalyst for oxygen reduction.

Homogeneous catalyst systems have been described before in connection with fuel cells. One such is described in our own co-pending United Kingdom to patent application no. 0605878.8, in which a polyoxometallate (POM) system is used as a catalyst. However, in certain types of fuel cell it may be desirable not to have such a high concentration of metal centres in the catalyst as are present in the polyoxometallate system:

It would therefore be advantageous to provide a catalytic system which is soluble in the catholyte solution (e.g. in aqueous solution when the catholyte solution is aqueous) but offers a similar catalytic rate of oxygen reduction at lower concentrations of catalyst, and/or operates at a higher potential. Additionally, a catalyst which can interact with a range of different mediators and/or additional catalysts, and a mediator which can interact with a range of different catalysts and/or additional mediators without precipitation could allow access to a versatile system capable of achieving increased current densities.

Also provided in accordance with the invention is a catholyte solution for use in such a redox fuel cell, the catholyte solution comprising at least one transition metal complex of a multidentate N-donor ligand as redox mediator and/or as redox catalyst.

Thus, we have found that complexed multidentate N-donor ligands in particular may be effective redox catalysts and/or redox mediators in fuel cell operation. Surprisingly, rates of catalysis on a molar basis similar to the POM system described in our co-pending United Kingdom patent application no. 0605878.8 are achievable by employing a lower relative concentration of metal centres.

The fuel cell of the invention preferably comprises at least one such complexed ligand in the catholyte solution. The N-donor ligands may generally be coordinated with any suitable metal or metals, for example suitable transition metals. Specific examples of suitable transition metal ions which can form complexes include manganese (II-V), iron (I-IV), copper (I-III), cobalt (I-III), nickel (I-III), chromium (II-VII), titanium (II-IV), tungsten (IV-VI), vanadium (II-V), and molybdenum (II-VI). More preferably the transition metal should be manganese (II-V), iron (II-IV), copper (I-III) or cobalt (I-III). The ligands themselves may contain carbon, hydrogen, oxygen, nitrogen, sulphur, halides and/or phosphorous, for example.

It may be desirable, for example if the complete N-donor metal complex is to be used as a catalyst and/or mediator in a PEM cell comprising a cation exchange membrane, that the complex be non-ionic in its oxidized form or, preferably, anionic. In this or in any other desired case, anionic charge may be introduced by modifying the N-donor ligand with one or more anionic charge inducing groups such as carboxylate, carboxylic acid, phosphate, phosphonate or phosphonic acid groups. Stronger acid groups such as sulphonate, sulphate or sulphonic acid could also be introduced.

Alternatively, when the complete N-donor metal complex is to be used as a catalyst and/or mediator in a PEM cell comprising a anion exchange membrane, it will preferably be non-ionic in its reduced form, or more preferably, cationic. Cationic charge may be introduced to the N-donor ligand by modifying it with cationic charge inducing groups such as protonated amines or quaternary amine groups.

The complete redox catalyst complex should be between four and eight coordinate, but more preferably six coordinate overall. Where the number of coordinating nitrogen atoms contained within the N-donor ligand is less than six, additional coordinating species are required. These species may be mono-, bi- and/or tridentate and may be either neutral or negatively charged. One skilled in the art will appreciate the vast array of suitable coordinating species which includes $H_2O$, $OH^-$, $Cl^-$, $CH_3OH$ and $CH_3CN$ as non-limiting examples.

In order to balance the charge of the transition metal catalyst, non-coordinating counter cations or anions are also present. Again, one skilled in the art will appreciate the vast array of suitable counter ions which includes $ClO_4^-$, $PF_6^-$, $Cl^-$, $CN^-$, $SO_4^{2-}$, $Na^+$ and $K^+$ as non-limiting examples.

Redox mediators and/or catalysts for use in conjunction with the N-donor ligand complex may be selected from a very large range of suitable materials, selected from for example ligated transition metal complexes and polyoxometallate species. Specific examples of suitable transition metals ions which can form such complexes include manganese (II-V), iron (I-IV), copper (I-III), cobalt (I-III), nickel (I-III), chromium (II-VII), titanium (II-IV), tungsten (IV-VI), vanadium (II-V) and molybdenum (II-VI). Ligands in such ligated transition metal complexes may be chelating such as 2,2'bipyridine and/or 1,10-phenanthroline, or non-chelating such as chloride and/or cyanide. Complexes of such ligands (e.g. transition metal complexes) may contain solely chelating or non-chelating ligands, or a mixture of the two.

One preferred redox mediator comprises a modified ferrocene species and is disclosed in PCT/GB2007/050420 and in our co-pending applications GB) P509431 GB and P509432 GB) filed 23 Jan. 2008.

If a modified ferrocene species is to be used as a redox mediator in a PEM cell comprising a cation exchange membrane, it will be preferably be non-ionic in its oxidized form or, more preferably, anionic. Anionic charge may be introduced to ferrocene by modifying it with anionic charge inducing groups such as carboxylate, carboxylic acid, phosphate, phosphonate or phosphonic acid groups. Stronger acid groups such as sulphonate, sulphate or sulphonic acid could also be introduced.

Alternatively, when the modified ferrocene species is to be used as a redox mediator in a PEM cell comprising a anion exchange membrane, it will preferably be non-ionic in its reduced form, or more preferably, cationic. Cationic charge may be introduced to ferrocene by modifying it with cationic charge inducing groups such as protonated amines or quaternary amine groups.

Thus, it may be seen that the charge of the modified ferrocene species may be easily modified. This allows it to be tailored to the particular conditions of to the cell with which it is to be used. For example, it may be tailored to the potential of the catholyte redox catalyst and the pH of the catholyte.

When the redox mediator is a modified ferrocene species, it may be represented by the formula:

wherein:
X and Y are independently selected from hydrogen and functional groups comprising halogen, hydroxy, amino, protonated amino, imino, nitro, cyano, acyl, acyloxy, sulphate, sulphonyl, sulphinyl, alkylamino, protonated alkylamino, quaternary alkylammonium, carboxy, carboxylic acid, ester, ether, amido, sulphonate, sulphonic acid, sulfonamide, phosphonyl, phosphonic arylsulphinyl, alkylthio, arylthio, alkyl, alkoxy, oxyester, oxyamido, aryl, arylamino, aryloxy, heterocycloalkyl, heteroaryl, ($C_2$-$C_5$)alkenyl, ($C_2$-$C_5$)alkynyl, azido phenylsulphonyloxy or amino acid conjugates having the formula —CO—W—OH, where W is an amino acid.

Preferably, at least one of X and Y are independently selected from hydrogen and functional groups comprising, halogen, hydroxy, amino, protonated amino, imino, acyl, sulphate, alkylamino, protonated alkylamino, quaternary alkylammonium, carboxy, carboxylic acid, ester, oxyester, alkoxy, sulphonyl, sulphinyl, alkylsulphonyl, sulphonic acid, sulphonamide, phosphonic acid, phosphonate, phosphate, amido, oxyamido or amino acid conjugates having the formula —CO—W—OH, where W is an amino acid and from alkyl, alkenyl, aryl, cycloalkyl, alkaryl alkenaryl, aralkyl, aralkenyl groups substituted with one or more of the aforesaid functional groups.

More preferably, at least one of X and Y are independently selected from hydrogen and functional groups comprising F, CHO, —$COCH_3$, —$COCH_2CH_3$, —$COCH_2CH_2COOH$, —COOH, —$(COOH)_2$, —$NH_2$, $NH_3^+$, —$N(CH_3)_2$, —$NH(CH_3)_2^+$, $N(CH_3)_3^+$, —$H(CH_2CH_3)_2$, —$NH(CH_2CH_3)^+$, —N(CH$_2$CH$_3$)$_3^+$, —CH$_2$N(CH$_3$)$_2$, CH$^2$NH(CH$_3$)$_2^+$, —CH$_2$N(CH$_3$)$_3^+$, —OH, —CH$_2$OH, —CH(OH)CH$_3$, —OSO$_3^-$, —SO$_3^-$, —CH$_2$SO$_3^-$, —CH$_2$OSO$_3^-$, PO(OH)$_2$, —OPO(OH)$_2$—CO-Gly-OH, —CO-Glu-OH or —CO-Asp-OH, and from alkyl, alkenyl, aryl, cycloalkyl, alkaryl alkenaryl, aralkyl, aralkenyl groups substituted with one or more of the aforesaid functional groups.

There may be any number from 1 to 5 X substituents, in which case each X substituent may be the same or different. There may be any number from 1 to 5 Y substituents, in which case each Y substituent may be the same or different. All five X groups and all five Y groups cannot concomitantly be hydrogen.

The concentration of the redox mediator in the catholyte solution is preferably at least about 0.0001M, more preferably at least about 0.005M, and most preferably at least about 0.001M.

The concentration of the redox catalyst in the catholyte solution is preferably at least about 0.0001M, more preferably at least about 0.005M, and most preferably at least about 0.001M.

In one preferred embodiment of the invention, the ion selective PEM is a cation selective membrane which is selective in favour of protons versus other cations. In this case the pH of the catholyte is preferably acidic. It preferably has a pH of below 7, more preferably below 4, even more preferably below 2 and most preferably below 1.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulphonic acid resins, and the like. Perfluorocarboxylic acid resins are preferred, for example "Nafion" (Du Pont Inc.), "Flemion" (Asahi Gas Ltd),"Aciplex" (Asahi Kasei Inc), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, poly-trifluorostyrene sulphonic, sulphonated trifluorostyrene, sulphonated copolymers based on α,β,β trifluorostyrene monomer, radiation-grafted membranes. Non-fluorinated membranes include sulphonated poly(phenylquinoxalines), poly (2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl suphonic acid siloxane (PBSS).

In another preferred embodiment of the invention, the ion selective PEM is an anionic selective membrane. Suitable examples of anionic membranes include quaternary amine derivatives of styrene cross-linked with divinyl benzene and polymerised in the presence of finely powdered polyvinyl chloride to provide strength.

In embodiments where the PEM is anion selective, the catholyte is preferably alkaline. It preferably has a pH above 7, more preferably above 8.

In some cases it may be desirable for the ion selective polymer electrolyte membrane to comprise a bi-membrane.

The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be to placed side-by-side with an optional gap there between. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution in the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials other than protons from passing therethrough from the cathode side to the anode side thereof. In this case protons may pass from anode to cathode.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprise one or more perforations in the cation selective membrane, allowing such flushing directly through the membrane. Alternatively means may be provided for channelling flushed materials around the cation selective membrane from the interstitial space to the cathode side of the said membrane.

A representative example of a useful bipolar membrane, the arrangement used with the anionic-selective membrane on the anode side is that sold under the trademark Neosepta (R) BP-1, available from Tokuyama Corporation.

According to another aspect of the present invention, there is provided a method of operating a proton exchange membrane fuel cell comprising the steps of:

a) forming H$^+$ ions at an anode situated adjacent to a proton exchange membrane;

b) supplying the catholyte of the invention with its redox mediator in an oxidised state and its redox catalyst in a reduced state to a cathode situated oppositely adjacent to the proton exchange membrane; and c) allowing the mediator to become reduced upon contact with the cathode concomitantly with H$^+$ ions passing through the membrane to balance charge.

In another embodiment, the catholyte is supplied from a catholyte reservoir.

The method of the above fourth aspect may additionally comprise the step of:

d) passing the catholyte from the cathode to a reoxidation zone wherein the mediator is reoxidised by the catalyst reacting with the oxidant.

In another embodiment, the method of the above aspect comprises the step of:

e) passing the catholyte from the reoxidation zone to the catholyte reservoir.

In this embodiment, the cell is cyclic and the mediator and catalyst in the catholyte may be repeatedly oxidised and reduced without having to be replaced.

An electricity loading device configured to load an electric power may also be provided in association with the fuel cell of the invention.

The fuel cell of the invention may comprise a reformer configured to convert available fuel precursor such as LPG, LNG, gasoline or low molecular weight alcohols into a fuel gas (e.g. hydrogen) through a steam reforming reaction. The cell may then comprise a fuel gas supply device configured to supply the reformed fuel gas to the anode chamber.

Preferred fuels include hydrogen; metal hydrides, for example borohydride which may act as fuel itself or as a provider of hydrogen, low molecular weight alcohols, aldehydes and carboxylic acids, sugars and biofuels as well as LPG, LNG or gasoline.

Preferred oxidants include air and oxygen. Peroxides may also be contemplated.

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel, titanium and other metals to inert in the specific catholyte and metal oxide or sulphide. One preferable material for the cathodes is reticulated vitreous carbon or carbon fibre based electrodes such as carbon felt. Another is nickel foam or mesh, or titanium foam or mesh. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox mediator flowing in solution in the cathode chamber in operation of the cell is used in the invention with a catalyst for the reduction of oxygen in the cathode chamber, in accordance with the following (wherein Sp is the redox couple species).

The redox couple, and any other ancillary redox couple, utilised in the fuel cell of the invention should be non-volatile, and is preferably soluble in aqueous to solvent. Preferred redox couples should react with the oxidant at a rate effective to generate a useful current in the electrical circuit of the fuel cell, and react with the oxidant such that water is the ultimate end product of the reaction.

The fuel cell of the invention requires the presence of at least one redox mediator species and also a redox catalyst comprising a transition metal complex of a multidentate N-donor ligand. However, in some circumstances it may also be possible to include other redox couples in the catholyte solution as ancillary redox couples.

BRIEF DESCRIPTION OF THE DRAWINGS

Various aspects of the present invention will now be more particularly described with reference to the following Figures.

DETAILED DESCRIPTION

Figure 1:
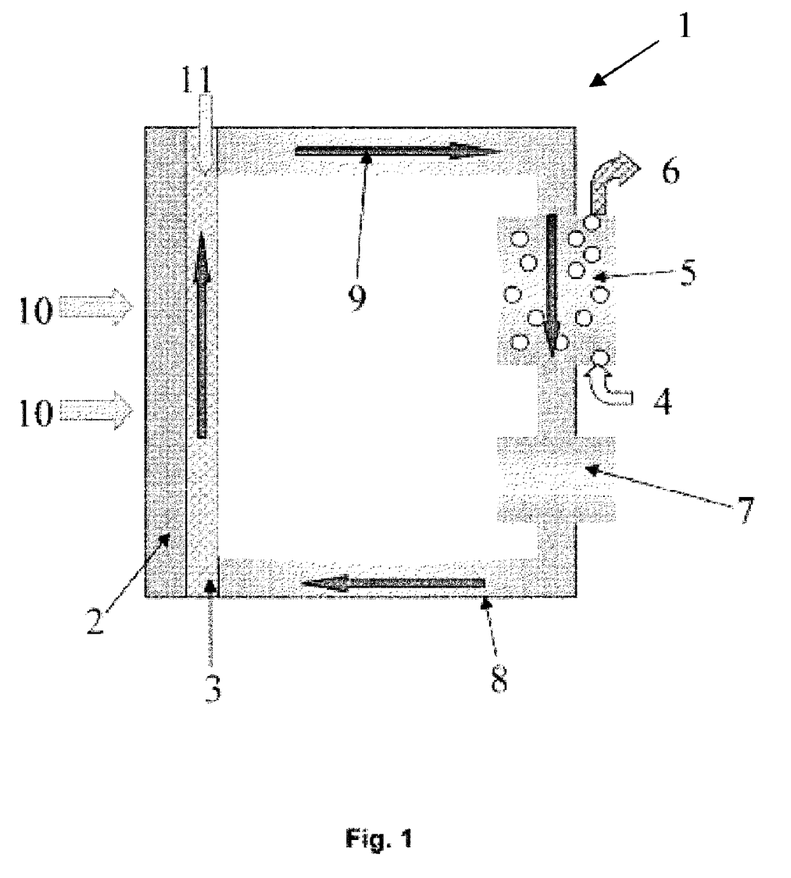
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel gas (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the mediator reoxidation zone) is provided with exhaust 6, through which the by-products of the fuel cell reaction (e.g. water and heat) may be discharged.

A catholyte solution comprising the oxidised form of the redox mediator is supplied in operation of the cell from catholyte reservoir 7 into the cathode inlet channel 8. The catholyte passes into reticulated carbon cathode 3, which is situated adjacent membrane 2. As the catholyte passes through cathode 3, the redox mediator is reduced, and is then returned to cathode gas reaction chamber 5 via cathode outlet channel 9.

Due to the advantageous composition of the catholyte of the present invention, reoxidation of the mediator occurs, catalysed by the transition metal complex of a multidentate N-donor ligand, which allows greater flexibility in designing catholyte systems for the fuel cell to produce for higher potential and/or a higher sustainable current than with catholytes of the prior art.

The following non-limiting examples describe the synthesis of a selection of macrocyclic N-donor ligands.

EXAMPLE 1

N,N',N''-Tris(4-chloropyridine-2-methyl)-1,4,7-triazacyclononane

(a) Synthesis of 4-Chloro-2-chloromethylpyridine

4-Chloro-2-pyridinemethanol (1.0 g, 6.965 mmol) was dissolved in dichloromethane (25 cm$^3$), heated to reflux and then treated slowly with a solution of thionyl chloride (1.50 cm$^3$, d=1.631 gcm$^{-3}$, 0.0206 mmol) in DCM (25 cm$^3$). The reaction mixture was then stirred at 60° C. for 3 h, soon turning pink. After this time the DCM was evaporated off and the pale pink residue carefully neutralised with saturated sodium bicarbonate solution (40 cm$^3$). The product was then extracted into DCM (3×30 cm$^3$) and dried over sodium carbonate for 30 min. After filtration the product solution was then concentrated to a low volume and filtered through a short silica column (1:4 methanol/DCM as eluent), giving a pale yellow solution. This was then concentrated down to a red/brown oil, dried at 50° C., which was the desired product 4-chloro-2-chloromethylpyridine (934 mg, 83%); $^1$H NMR (CDCl$_3$); $\delta_H$ 8.40 (d, 1H, J=5.5), 7.44 (d, 1H, J=1.5), 7.19 (dd, 1H, J=5.5, 1.5), and 4.58 (s, 2H) ppm.

(b) Synthesis of N,N',N''-Tris(4-chloropyridine-2-methyl)-1,4,7-triazacyclo-nonane 4-Chloro-2-chloromethylpyridine (1.0 g, 6.172 mmol) was suspended in distilled water (5 cm$^3$), treated with 1,4,7-triazacyclononane (239 mg, 1.852 mmol), 5 M aqueous sodium hydroxide solution (2 cm$^3$) and hexadecyltrimethylammonium chloride (0.05 cm$^3$, 25% in water) and then stirred at room temperature for 4 days. After complete reaction was confirmed by thin layer chromatography (1:9 methanol/DCM as eluent), the reaction mixture was diluted with water (10 cm$^3$) and extracted with dichloromethane (3×20 cm$^3$). The combined organic layers were then washed once with water (10 cm$^3$) and dried over magnesium sulfate for ~2 h. The product solution was then filtered and concentrated down to a thick orange oil, dried under vacuum, found to be N,N',N''-tris(4-chloropyridine-2-methyl)-1,4,7-triazacyclononane (985 mg, 95%). $^1$H NMR (CDCl$_3$); $\delta_H$ 8.34 (d, 3H, J=5.4), 7.49 (s, 3H), 7.10 (d, 3H, J=5.4), 3.78 (s, 6H) and 2.83 (s, 12H) ppm; $^{13}$C NMR (CDCl$_3$); $\delta_C$ 149.9 (CH), 144.6 (q), 123.4 (CH), 122.4 (CH), 64.1 (CH$_2$) and 55.7 (CH$_2$) ppm.

EXAMPLE 2

N,N',N''-Tris(2-(4-sulfonato)-pyridylmethyl)-1,4,7-triazacyclononane trisodium salt N,N',N''-Tris(4-chloropyridine-2-methyl)-1,4,7-triazacyclononane (200 mg, 0.395 mmol) was dissolved in ethanol (5 cm$^3$) and treated with a solution of sodium sulfite (448 mg, 3.558 mmol) in distilled water (5 cm$^3$) and heated under reflux for 3 days, with extra solvents added as needed to dissolve all reactants. After this time the solvents were removed to leave a pale yellow solid, which was then stirred in isopropyl alcohol (50 cm$^3$) for 3 h. The inorganic impurities were then filtered off and the filtrate concentrated down to a thick yellow oil, dried under vacuum at 50° C., which was the desired product (194 mg, 69%). $^1$H NMR (d$_4$-MeOH); $\delta_H$ 8.28 (d, 3H, J=5.3), 7.61 (d, 3H, J=2.0), 7.30 (dd, 3H, J=5.3, 2.0), 4.12 (s, 6H) and 2.97 (s, 12H) ppm; $^{13}$C NMR (d$_4$-MeOH); $\delta_C$ 159.1 (q), 151.5 (CH), 146.5 (q), 125.2 (CH), 124.8 (CH), 60.6 (CH$_2$) and 50.6 (CH$_2$) ppm.

The performance of the catholyte of the present invention is described in the following examples.

EXAMPLE 3

The oxidation of mediator (dimethylaminomethyl)ferrocene (Fc-CH$_2$NMe$_2$) by oxygen was studied at 75° C. in 0.1 M glycine buffer solution at pH 2.5, using an iron(II) complex of the macrocyclic ligand N,N',N''-tris(2-(4-sulfonato)-pyridylmethyl)-1,4,7-triazacyclononane trisodium salt as an oxidation catalyst. The oxidation of Fc-CH$_2$NMe$_2$ to [Fc-CH$_2$NMe$_2$] can be monitored using UV-Vis absorption spectroscopy as the oxidised product exhibits a peak at 626 nm which is not present in any of the starting materials.

Figure 2:
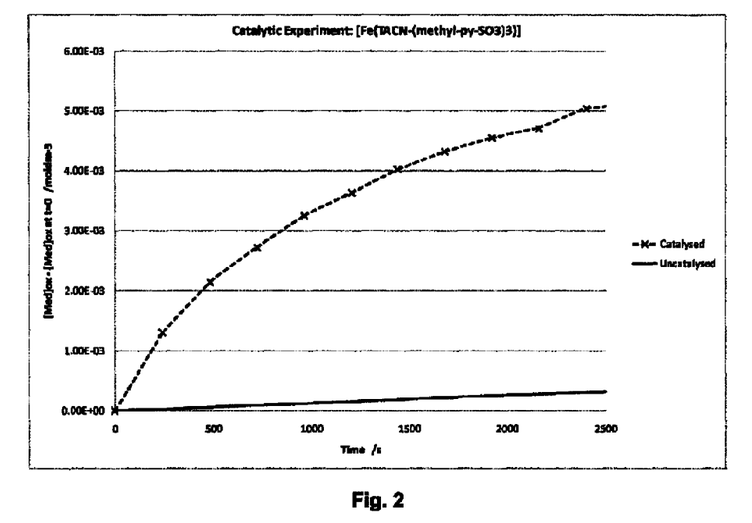
FIG. 2 shows a comparison of the uncatalysed and catalysed rate of oxidation of (dimethylaminomethyl)ferrocene by oxygen.

A solution containing 15 mM (dimethylaminomethyl)ferrocene and 1.0 mM of an iron(II) complex of N,N',N''-tris(2-(4-sulfonato)-pyridylmethyl)-1,4,7-triazacyclononane trisodium salt was formed under an atmosphere of nitrogen at 75° C. As oxygen was bubbled through the solution the increase in absorbance at 626 nm was monitored with time. The data is given in FIG. 2 with uncatalysed data for comparison, and shows that this macrocyclic N-donor complex does catalyse the oxidation of the (dimethylaminomethyl)ferrocene mediator with an initial rate of approximately $5.5 \times 10^{-6}$ moldm$^{-3}$s$^{-1}$ compared to $0.13 \times 10^{-6}$ moldm$^{-3}$s$^{-1}$ for the uncatalysed oxidation.

EXAMPLE 4

Figure 3:
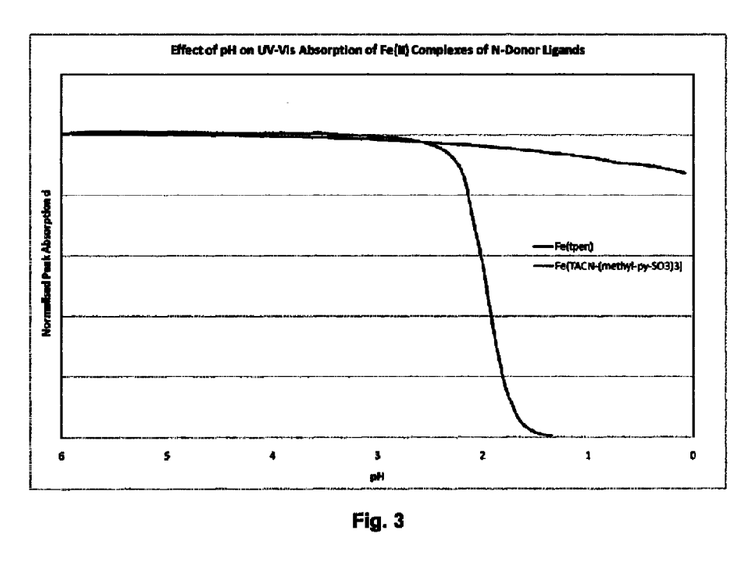
FIG. 3 shows the effect of pH on complex formation for a macrocyclic and a non-macrocyclic N-donor ligand.

A titration experiment was conducted to compare complex formation at low pH values for macrocyclic and non-macrocyclic N-donor ligands. A solution was prepared which contained 0.1 mM iron(II) sulfate heptahydrate and 0.1 mM of either macrocylic ligand N,N',N''-tris(2-(4-sulfonato)-pyridylmethyl)-1,4,7-triazacyclononane trisodium salt (TACN-(methyl-py-$SO_3$)$_3$) or non-macrocyclic ligand N,N,N',N'-tetrakis(2-pyridylmethyl)-ethane-1,2-diamine (tpen). An initial UV-Vis absorption spectrum was recorded before adding aliquots of aqueous sulfuric acid to lower the pH. Further UV-Vis absorption spectra were recorded as the pH was lowered to determine when protonation of the ligand was competing with coordination to iron(II). Results are displayed in FIG. 3 and show that the solution containing the non-macrocyclic complex begins to lose UV-Vis activity at pH 2.4 and has lost all activity by pH 1.5, indicating that decomplexation is occurring due to protonation of the N-donors in the ligand in this pH region. However, for the solution containing the macrocyclic ligand, even at pH values as low as 0.1, there is still significant absorption due to complexation. This shows that protonation is not competing with complexation as strongly for this ligand and that the macrocyclic ligand provides increased robustness at lower pH values.

The invention claimed is:

1. A redox fuel cell comprising:
    an anode region comprising an anode and a cathode region comprising a cathode, said regions being separated by an ion selective polymer electrolyte membrane;
    a fuel passage through which fuel is supplied to the anode region of the cell;
    an oxidant inlet that supplies an oxidant to the cathode region of the cell;
    an electrical circuit between the anode and the cathode; and
    a catholyte solution comprising at least one non-volatile catholyte component flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, the catholyte solution further comprising a complexed multidentate macrocyclic N-donor ligand as at least one of said redox mediator and a redox catalyst catalysing the regeneration of the said mediator.

2. A fuel cell according to claim 1 wherein the catholyte solution comprises the complexed multidentate N-donor ligand as said redox mediator, and as said redox catalyst.

3. A fuel cell according to claim 1 wherein the catholyte solution comprises a redox mediator and the complexed multidentate N-donor ligand as redox catalyst.

4. A fuel cell according to claim 1 wherein the catholyte solution comprises the complexed multidentate N-donor ligand as redox mediator and a further material as redox catalyst.

5. A fuel cell according to claim 1 wherein the oxidant is reduced in the catholyte solution by the redox catalyst.

6. A fuel cell according to claim 5 wherein the resulting oxidised redox catalyst at least partially oxidises the mediator to regenerate the mediator after its reduction at the cathode.

7. A fuel cell according to claim 1 wherein the catholyte solution is an aqueous solution.

8. A fuel cell according to claim 1 wherein the complexed multidentate N-donor ligand comprises a transition metal complex of the multidentate N-donor ligand.

9. A fuel cell according to claim 1 wherein the macrocyclic N-donor ligand comprises a molecular component containing a ring of seven or more atoms.

10. A fuel cell according to claim 9 wherein the macrocyclic N-donor ligand comprises a polycyclic ring in which seven or more atoms are present in the polycyclic ring structure and wherein one or more individual rings of the polycycle may comprise less than six or fewer atoms.

11. A fuel cell according to claim 1 wherein the N-donor ligand is stable under acidic pH conditions.

12. A fuel cell according to claim 1 wherein the N-donor ligand as a whole has macrocyclic structure.

13. A fuel cell according to claim 1 wherein the N-donor ligand comprises a number of different parts, wherein at least one of the parts has a macrocyclic structure.

14. A fuel cell according to claim 12 wherein the N-donor ligand comprises a multiplicity of N-donor atoms, wherein at least one of the N-donor atoms are contained within the macrocyclic structure.

15. A fuel cell according to claim 14 wherein not all the N-donor atoms are contained within the macrocyclic structure and wherein one or more other N-donor atoms are incorporated into substituent or pendent arms of the macrocyclic structure or of other parts of the N-donor ligand.

16. A fuel cell according to claim 14 wherein the number of N-donor atoms in the N-donor ligand is from 1 to 8.

17. A fuel cell according to claim 14 wherein the N-donor atoms within the N-donor ligand are contained within at least one of an aliphatic environment and within an optionally substituted aromatic or non-aromatic heterocycle.

18. A fuel cell according to claim 14 wherein the N-donor atoms within the macrocyclic structure carry one or more substituent groups.

19. A fuel cell according to claim 18 wherein the substituent groups are selected from the group consisting of: H, optionally substituted straight or branched chain alkyl, alkenyl, alkynyl, aryl, cycloalkyl, heterocyclic, heteroaryl, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

20. A fuel cell according to claim 14 wherein N-donor atoms within the macrocyclic structure are connected together by any suitable connecting group.

21. A fuel cell according to claim 20 wherein each connecting group is independently selected from optionally substituted straight or branched chain $C_1$-$C_6$ aliphatic carbon chains, alkene, alkyne, aryl, alkylaryl, carbocyclic groups, heteroaryl groups, amide, ether, ester, ketone, carbonyl containing groups, and from alkyl, alkenyl, aryl, cycloalkyl, alkaryl, alkenaryl, aralkyl, aralkenyl groups substituted with one or more of the aforesaid functional groups.

22. A fuel cell according to claim 14 wherein the macrocyclic structure carries one or more suitable substituents at any suitable position on the ring.

23. A fuel cell according to claim 14 wherein the N-donor ligand is one or more of bridged and cross-linked to form a more rigid structure and/or a cage like system.

24. A fuel cell according to claim 23 wherein the N-donor ligand comprises a bridging unit capable of linking between one or more of carbon atoms and nitrogen atoms contained within the macrocyclic structure.

25. A fuel cell according to claim 24 wherein the bridging unit contains one or more further N-donor atoms.

26. A fuel cell according to claim 25 wherein the bridging unit contains from 1 to 3 further N-donor atoms.

27. A fuel cell according to claim 25 wherein the further N-donor atoms(s) is or are contained within an optionally substituted aromatic or aliphatic environment.

28. A fuel cell according to claim 25 wherein the length of the bridging unit is 3 to 11 atoms long.

29. A fuel cell according to claim 28 wherein the bridging unit is an alkylheteroaryl or alkylamine unit.

30. A fuel cell according to claim 24 wherein the bridging unit is selected from $C_1$-$C_4$ alkyl groups and optionally contains one or more of alkyne, aryl, alkylaryl, carbonyl, carboxylate, ketone, ether and ester groups.

31. A fuel cell according to claim 1 wherein the N-donor ligand has the structure:

wherein each R is the same or different and comprises H or any substituent group selected from optionally substituted straight or branched chain alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido, and from alkyl, alkenyl, aryl, cycloalkyl, alkaryl, alkenaryl, aralkyl, aralkenyl groups substituted with one or more of the aforesaid functional groups;

wherein X is a non-N containing linking group;

wherein a and b may be the same or different and from 1 to 5; and wherein c is from 1 to 5.

32. A fuel cell according to claim 1 wherein the multidentate macrocyclic N-donor ligand has the structure:

wherein $R^2$ and, independently, $R^3$ are selected from H and from optionally substituted straight or branched chain, alkyl, alkenyl, alkynyl, aryl, cycloalkyl, heterocyclic, heteroaryl, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups;

a, b, c and d are independently from 1 to 5; and n is from 0 to 4.

33. A fuel cell according to claim 1 wherein the multidentate macrocyclic N-donor ligand has the structure:

wherein n is from 1 to 5; and each R and R' are the same or different and are selected from H and from optionally substituted straight or branched chain alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

34. A fuel cell according to claim 1 wherein the multidentate macrocyclic N-donor ligand has the structure:

wherein n is from 1 to 5;

m is from 1 to 5;

each R and R' and R" are the same or different and are selected from H and from optionally substituted straight or branched chain alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups; and X is a non N-containing bridging group.

35. A fuel cell according to claim 1 wherein the multidentate macrocyclic N-donor ligand has the structure:

wherein X is a bridging substituent optionally including a coordinating atom;

each R, R' and R" is the same or different is are selected from H and from optionally substituted straight or branched chain alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

36. A fuel cell according to claim 1 wherein the multidentate macrocyclic N-donor ligand has the structure:

wherein each R, R' and R" is the same or different is are selected from H and from optionally substituted straight or branched chain alkyl, alkenyl, alkynyl, aryl, cycloalkyl, heteroaryl, heterocyclic, halogen, hydroxy, amino, imino, nitro, cyano, acyl, acyloxy, sulfate, sulfonyl, sulphinyl, carbonyl, carboxy, carboxylic acid, ester, ether, amido, sulfonate, sulfonic acid, sulphonamide, phosphonate, phosphonyl, phosphonic acid, alkoxycarbonyl, thio, alkoxy, oxyester, oxyamido, aryloxy, heterocycloalkyl, azido and alkyl, alkenyl, aryl, cycloalkyl, alkaryl, alkenaryl, aralkyl, aralkenyl groups substituted with one or more of the aforesaid functional groups.

37. A fuel cell according to claim 1 wherein the ion selective polymer electrolyte membrane is a cation selective membrane which is selective in favor of protons versus other cations.

38. A fuel cell according to claim 37 wherein the catholyte is acidic.

39. A fuel cell according to claim 1 wherein the ion selective polymer electrolyte membrane is an anion selective membrane.

40. A fuel cell according to claim 39 wherein the catholyte is alkaline.

41. A fuel cell according to claim 1 wherein the ion selective polymer electrolyte membrane is a bimembrane.

42. A fuel cell according to claim 1 wherein the redox mediator comprises a modified ferrocene species.

43. A catholyte for use in a fuel cell according to claim 1, the catholyte comprising a redox mediator which can be at least partially reduced at a cathode of a fuel cell in operation of the cell and at least partially regenerated by, optionally indirect, reaction with an oxidant after such reduction at the cathode, and a redox catalyst which can catalyse the regeneration of the said mediator, a multidentate N-donor ligand complex being provided in the catholyte as the said redox mediator and/or as the said redox catalyst.

44. A method of operating a proton exchange membrane fuel cell comprising the steps of:
forming $H^+$ ions at an anode situated adjacent to a proton exchange membrane;
supplying the catholyte of claim 43 with its redox mediator in an oxidised state and its redox catalyst in a reduced state to a cathode situated oppositely adjacent to the proton exchange membrane; and
allowing the mediator to become reduced upon contact with the cathode concomitantly with $H^+$ ions passing through the membrane to balance charge.

45. A fuel cell according to claim 30 wherein the bridging unit contains one or more of alkyne, aryl, alkylaryl, carbonyl, carboxylate, ketone, ether and ester groups.

* * * * *